A. AICHELE.
CHANGE SPEED GEARING.
APPLICATION FILED MAY 31, 1917.
1,299,093.
Patented Apr. 1, 1919.
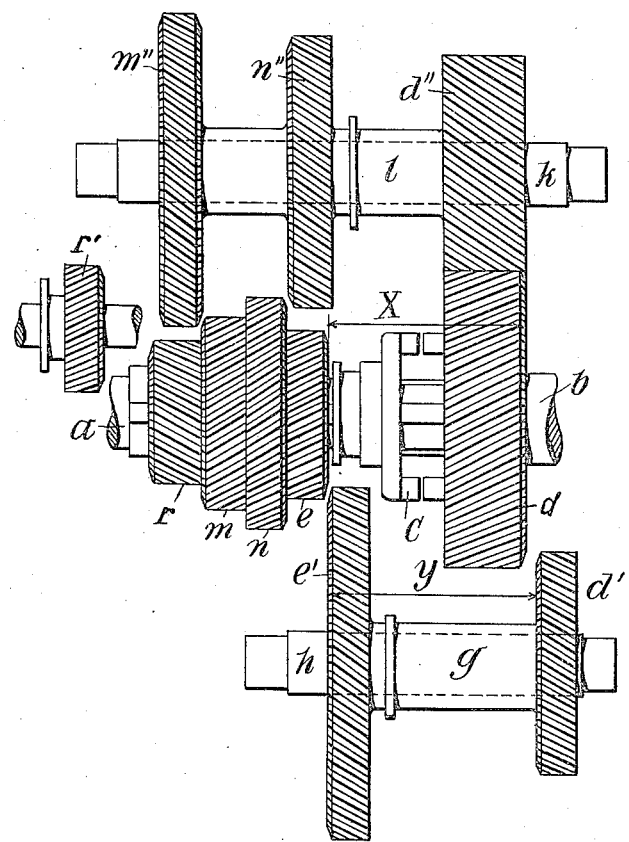
Inventor
Albert Aichele
By his Attorney

UNITED STATES PATENT OFFICE.

ALBERT AICHELE, OF BADEN, SWITZERLAND.

CHANGE-SPEED GEARING.

1,299,093.  Specification of Letters Patent.  Patented Apr. 1, 1919.

Application filed May 31, 1917. Serial No. 171,819.

*To all whom it may concern:*

Be it known that I, ALBERT AICHELE, a citizen of Switzerland, and a resident of Baden, in Switzerland, have invented certain new and useful Improvements in Change-Speed Gearings, of which the following is a specification.

In my prior Patent No. 1,188,528, issued June 27, 1916, (reissued May 1st, 1917, No. 14,293) I have described a change speed spur gearing, particularly designed for use on motor vehicles and which is particularly noiseless and efficient in operation.

In the specific construction there disclosed, all of the teeth are helical or inclined in respect to their axes and a pair of rigidly connected gears on a counter-shaft are adapted to be bodily and simultaneously moved to bring one of them into mesh with a coacting gear on one of the main shafts, the other of the two counter-shaft gears being constantly engaged with its coacting gear on the other main shaft. The several gears have their teeth inclined at such angles that the axial thrusts on the counter-shaft gears neutralize or equalize each other. Each counter-shaft for forward driving is shown as serving for two different forward speeds, there being a constantly meshing gearing to one main shaft and two gears which may be brought into mesh alternately with separate gears on the other shaft.

In this construction, it will be noted that all of the counter-shafts for forward driving are constantly rotated when any one of the counter-shaft set of gears is in operation.

My present invention is particularly applicable to the type of construction covered by my prior patent and possesses certain important advantages where more than three transmission speeds are desired.

The main object of my present invention is to utilize the broad principle of my prior invention but, at the same time, permit the counter-shaft gearing, which is used for the lowest speed or speeds, to be entirely cut out and remain at rest when the mechanism is being used for the transmission of higher speeds. To secure this object, the rigidly connected, axially movable gears for the low speed drive do not include any constantly engaged gear and are bodily movable to such an extent that they may all move out of mesh.

All of the sets of counter-shaft gears could be arranged in this manner so that only one would operate at a time, the remainder remaining at rest, although for higher speeds, it is desirable to retain the pair of constantly intermeshing gears to avoid the shock which the gears would suffer by the meshing at high speeds and by reason of the sudden mass exhilaration which might become dangerous to the gears and lead to the breaking of the gears or the teeth thereof.

In the accompanying drawings, to which reference is to be had, I have shown a plan view of one embodiment of my present invention, designed for giving four forward speeds (including direct drive) and one reverse speed. Two counter-shafts are employed, one of which has a series of three gears similar to those of the counter-shafts of my prior patent, and the other, namely that for the smallest or lowest speed, is designed to have all of the gears moved out of mesh.

In the specific construction illustrated, the driving or motor shaft $a$ is in alinement with the driven or propeller shaft $b$ and a suitable clutch mechanism $c$ is employed for directly connecting them when desired. The driving shaft has rigid thereon four gears $r$, $m$, $n$ and $e$, while the driven shaft has the single gear $d$. The counter-shaft $k$ has an axially movable, keyed sleeve $l$ carrying gears $d''$, $n''$ and $m''$. The gears $d$, $d''$ are designed to be contantly in mesh and the axial movement of the sleeve $l$, which rigidly connects the gears $d''$, $n''$ and $m''$, in one direction, brings the gears $n$ and $n''$ into mesh, while a movement in the opposite direction brings the gears $m$ and $m''$ into mesh.

This is similar to the construction illustrated in my prior patent except that the constantly meshing gear $d$ is here shown on the driven shaft instead of on the driving shaft. This reversal has nothing to do with the present invention but is a permissible arrangement by reason of the noiseless operation of the gearing.

The gears are so proportioned that for the highest or fourth speed, the coupling $c$ directly connects the driving and driven shafts, while for the third and second speeds, the sleeve $l$ is moved one way or the other. For the lowest speed, I provide a counter-shaft $h$ having an axially movable keyed sleeve $g$ rigidly connecting gears $e'$ and $d'$. The gear $e'$ is designed to mesh with a gear $e$ on the driving shaft, while the gear $d'$ is designed to mesh with a gear *d* on the driven shaft. The axial movement of the sleeve *g* is such that both of the gears thereon may be moved entirely out of mesh with their co-acting gears when it is desired to run at any other speed than the lowest speed for which the gears on this counter-shaft are provided.

Preferably, the gears are so designed in respect to each other that one pair of gears, preferably the gears *e*, *e'*, come into mesh slightly in advance of the other pair of gears, namely *d*, *d'*. This is indicated by the fact that the distance marked "X" in the drawing is slightly less than the distance marked "Y".

As a motor vehicle is ordinarily driven at the lowest gear speed for a comparatively small portion of the time, it is unimportant that the sleeve *l* and its gears are rotating while the gears of the sleeve *g* are in mesh. It is important that the sleeve *g* and its gears are not running while the vehicle is at the second, third or fourth (highest) speed.

If a fifth speed is desired, the sleeve *g* may be provided with an additional pair of gears, one of which will come into mesh with the gear *d* when the sleeve *g* is moved still farther to the right from the position shown in the drawing, and the other of which will approximately simultaneously come into mesh with an additional gear on the shaft *a* and which is slightly larger or smaller in size than the gear *e*.

For reverse drive, there is provided a third countershaft having a gear *r'* so positioned that upon its axial movement it may come into mesh with the gear *r* on the driving shaft and with the gear *m''* on the sleeve *l*. In order to drive backward at a speed materially less than the second forward speed, the gear *r* is made materially smaller than the gear *m*.

Having thus described my invention, what I claim as new and desire to secure by Letters Patent is:

1. A change speed gearing, comprising a driving shaft, a driven shaft, a single gear on one of said shafts, a plurality of gears on the other of said shafts, a countershaft having a plurality of rigidly connected, axially movable gears, one of which is permanently maintained in mesh with said single gear, a second counter-shaft, and a plurality of rigidly connected gears thereon bodily movable to complete unmeshing position.

2. A change speed gearing, comprising a driving shaft, a driven shaft, a single gear on one of said shafts, a plurality of gears on the other of said shafts, a counter-shaft having a plurality of rigidly connected, axially movable gears, one of which is permanently maintained in mesh with said single gear, a second counter-shaft, and a plurality of rigidly connected gears thereon bodily movable to complete unmeshing position, all of said gears having their teeth inclined in respect to their axes.

3. A change speed gearing, including a driving shaft, a driven shaft, a single gear on one of said shafts, a plurality of gears on the other of said shafts, a counter-shaft, and a pair of rigidly connected, axially movable gears on said countershaft, one of said gears movable into mesh with said single gear upon the movement of the other of said gears into mesh with one of said plurality of gears, said gears having their teeth inclined in respect to their respective axes, the extent of the inclination being such that the trigonometrical tangents of the angles of inclination are proportional to the pitch diameters of the gears and the direction of inclination being the reverse for the drive to and from the counter-shaft so that the axial thrust of one gear thereon is substantially compensated by that of the other gear thereon.

4. A change speed gearing, including a driving shaft, a driven shaft, a single gear on one of said shafts, a plurality of gears on the other of said shafts, a countershaft, and a pair of rigidly connected, axially movable gears on said counter-shaft, one of said gears movable into mesh with said single gear upon the movement of the other of said gears into mesh with one of said plurality of gears, one of said intermeshing actions taking place slightly in advance of the other.

5. A change speed gearing, including a drive shaft, a driven shaft, a counter-shaft, a gear on the driving shaft, a pair of gears on the counter-shaft and axially movable together, and a gear on the driven shaft, the extent of axial movement of the gears on said counter-shaft being such as to bring them into or completely out of mesh with said gears on the driving and driven shafts and all of said gears having their teeth inclined in respect to their axes, the general direction of inclination of the teeth being in reverse directions for the drive to and from the counter-shaft, whereby the axial thrust of one gear on the counter-shaft is counteracted by the opposite axial thrust of the other gear on the counter-shaft.

6. A change speed gearing, including a drive shaft, a driven shaft, a counter-shaft, a gear on the driving shaft, a pair of gears on the counter-shaft and axially movable together, and a gear on the driven shaft, the extent of axial movement of the gears on said counter-shaft being such as to bring them into or completely out of mesh with said gears on the driving and driven shafts and all of said gears having their teeth inclined in respect to their axes, the general direction of inclination of the teeth being in reverse directions for the drive to and from the counter-shaft, whereby the axial thrust of one gear on the counter-shaft is counteracted by the opposite axial thrust of the other gear on the counter-shaft, and the axial distance between the gears of the counter-shaft being such in respect to the axial distance between the gears on the driving and driven shafts that one gear on said counter-shaft comes into mesh slightly in advance of the other during endwise movement.

Signed at Zurich, Switzerland, this 4th day of May, 1917.

ALBERT AICHELE.